May 26, 1970 C. B. McKINNEY 3,514,131
LUER LOCK
Filed May 22, 1967

Carlton B. McKinney
INVENTOR.

BY J C Baisch
Attorney

United States Patent Office 3,514,131
Patented May 26, 1970

3,514,131
LUER LOCK
Carlton B. McKinney, Los Angeles, Calif., assignor to Hamilton Company, Whittier, Calif., a corporation of California
Filed May 22, 1967, Ser. No. 640,310
Int. Cl. F16l 25/00
U.S. Cl. 285—332                  5 Claims

ABSTRACT OF THE DISCLOSURE

A luer lock having an element rotatably mounted on a device having a luer part for releasably securing a mating luer part thereto.

---

This invention relates generally to connectors and the like and relates more particularly to improvements in luer locks.

One of the uses of luer locks is on valves and while the invention has particular utility in connection with luer locks on valves and the like and is shown and described in such connection it is to be understood that its utility is not confined thereto.

A PROBLEM TO BE SOLVED

Luer locks heretofore used have been integral with a connector device having a luer part to which another luer part is adapted to be connected.

In many cases the second mentioned luer part is at the end of a flexible tube and integral therewith, and in making the connection and in locking the luer parts together the tube must be twisted and often bent or kinked so that fluid flow through the tube is restricted.

In many situations the device, such as a valve, having the luer part and lock must be fastened or clamped down and the difficulty in attaching and locking the second mentioned luer part on the tube to the part having the lock is greatly increased.

Another difficulty or problem encountered in devices wherein the luer lock is integral with the device or valve is that in some situations it is desirable or necessary to have a special type of material defining the fluid passages as where there may be corrosive liquids to be passed through such passages.

BRIEF SUMMARY OF THE INVENTION

The present invention overcomes the above problems and difficulties thereof by providing a two or three piece construction. Using a valve by way of example, the valve body has at least one extension which has a luer part at the end to which another luer part is adapted to be attached and locked. The luer lock comprises a locking sleeve which has the advantage that it may be of metal such as stainless steel or other suitable material and does not need to be of the same material as the body of the valve. The locking sleeve is rotably mounted on the part of the valve which extends outwardly of the body and has internal threads of suitable character for engagement with a part provided therefor on the other luer part at the end of a piece of tubing. Thus another advantage of the invention is that it makes possible a choice of materials for the flow passages independently of the material of the locking sleeve.

Still another advantage of the invention is that in the final relationship of the components of the tube system there is great flexibility.

The characteristics and the advantages of the invention are further sufficiently referred to in connection with the following detailed description of the accompanying drawings which represent one embodiment. After considering this example skilled persons will understand that many variations may be made without departing from the principles disclosed and I contemplate the employment of any structures, arrangements or modes of operation that are properly within the scope of the appended claims.

Referring to the drawings, which are for illustrative purposes only:

Figure 1:
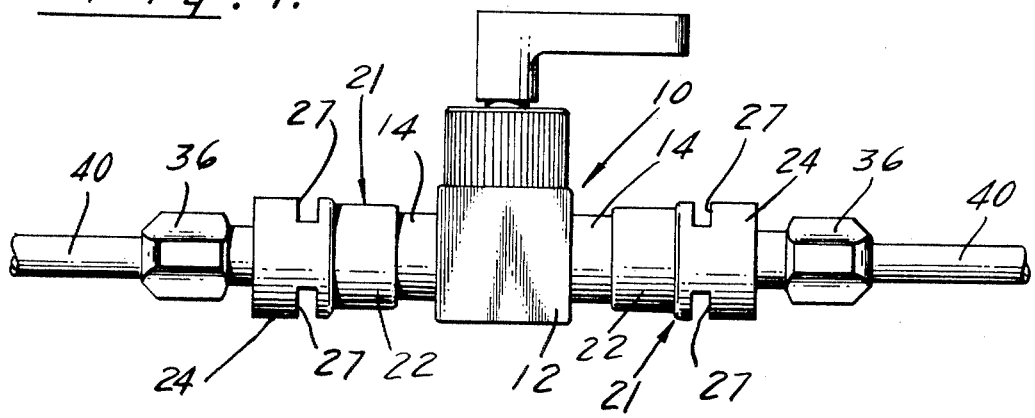
FIG. 1 is a side elevational view of a valve having luer locks embodying the present invention.
Figure 2:
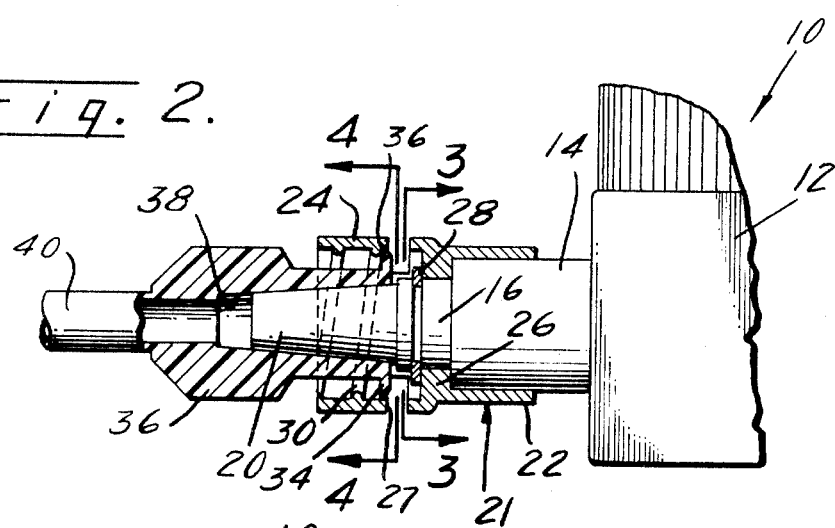
FIG. 2 is an enlarged side view, partially in section, of a portion of the valve having a luer lock.
Figure 3:
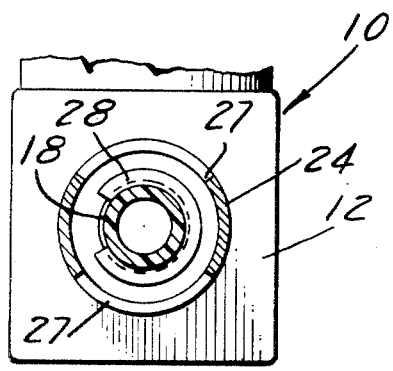
FIG. 3 is an enlarged sectional view taken on line 3—3 of FIG. 2.
Figure 4:
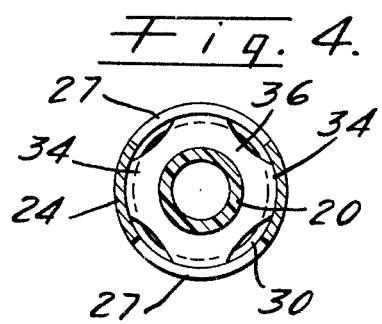
FIG. 4 is an enlarged sectional view taken on line 4—4 of FIG. 2.

Referring more particularly to the drawings there is shown a valve, indicated generally at 10, this valve being similar in construction to the valve shown particularly in FIGS. 1 to 6 of the Clark H. Hamilton application, Ser. No. 402,223, filed Oct. 12, 1964, for a valve. There is a metal housing 12 in which is disposed a body of a plastic material. The body has outwardly projecting parts or extensions 14 which are cylindrical. At the outer end of each of the parts 14 there is a reduced diameter cylindrical part 16 having an external annular groove 18 therein. At the outer end of the reduced diameter part 16 there is a luer part 20 which in the present disclosure is a male luer part. The luer part 20 is frustoconical in shape and tapers outwardly so that the free end is smaller than the opposite end. It is to be understood that there is a flow passage through the lower part, the reduced diameter part 16, the cylindrical part 14, the body of the valve and the part 14 at the opposite side of the valve, the reduced diameter part 16 and the luer part at the end thereof.

Since both sides of the valve are the same, the above description of the parts 14, 16, 18 and 20 is sufficient.

The luer lock comprises a generally tubular element or sleeve, indicated generally at 21, said sleeve having an inner end 22 that is hollow or recessed and is disposed on the outer end portion of the cylindrical part 14. There is a somewhat enlarged hollow part 24 at the outer or opposite end and at the junction of the parts 22 and 24 there is an internal annular flange 26 against the inner side of which the outer end of the cylindrical part 14 above rests. The flange 26 is rotatably disposed on that portion of the reduced diameter part 16 between the groove 18 and the outer end of the cylindrical part 14. The outer part 24 has oppositely arranged slots 27 therein which provide means through which a retaining ring 28 of any well known character may be inserted and placed in the groove 18 for engagement with the outer side of the flange 26 to thereby retain the luer lock sleeve in position on the cylindrical part 14 and the reduced diameter part 16. The luer lock sleeve is thus rotatably secured on the cylindrical part 14 and the reduced diameter part 16, the luer part 20 extending longitudinally beyond the outer end of the sleeve 21.

The interior of the outer end portion 24 is provided with threads 30 of suitable character for engagement with the annularly spaced teeth 34 of a luer hub 36 having a female luer part 38 which flares outwardly and is adapted to sealingly engage the male luer part 20 when the luer parts are locked together by the luer lock.

In order to attach the hub 36 to the valve the teeth 34 are inserted into the recess of the outer end portion 24 of the luer lock sleeve and said sleeve is then rotated in the proper direction to cause the teeth 34 to be pulled inwardly and the luer parts 20 and 38 sealingly connected together. The valve may be clamped against movement if desired and the connection of the hub 36 is effected without twisting or bending the tube 40 which is integral with said hub.

To disconnect the hub 36 it is only necessary to rotate the luer lock sleeve in the opposite direction to screw the teeth outwardly to a disconnected position.

The luer lock sleeve may, of course, be removed from the valve by removal of the spring clip 28 which releasably secures said sleeve on the valve.

The sleeve preferably is of a suitable metal, such as stainless steel for example. The body of the valve and the parts 14, 16 and 20 may be of similar material or any other suitable material different from the material of the luer lock sleeve. Consequently the material of the valve defining the passage or passages therethrough may be of any suitable character that will not be affected by the fluid being handled thereby. Some of these fluids may be very corrosive so that there is a very distinct advantage in being able to have that portion or those portions of the valve in which the flow passages extend of a material that may be selected for a specific purpose rather than having the entire device formed integrally so that there would be no chance to select or provide materials for the valve different from the luer lock.

It is also to be understood that the present invention may be used on other devices than a valve.

The attendant advantages will be understood from the foregoing description and it will be apparent that various changes may be made in the form, construction and arrangement of the parts of this invention without departing from the spirit inscript thereof or sacrificing the material advantages, the arrangement hereinbefore described being merely by way of example, and I do not wish to be restricted to the specific form shown or uses mentioned except as defined in the accompanying claims.

I claim:

1. In connecting means for connecting together mating luer parts:
   (A) a device having an outwardly extending cylindrical part;
   (B) a reduced diameter part extending from the free end of said cylindrical part;
   (C) a luer part extending from the free end of the reduced diameter part, there being fluid flow passageway means in said parts;
   (D) a tubular sleeve having an inner end part rotatably mounted on the cylindrical part, and an internally threaded outer end portion;
   (E) means for retaining said sleeve for free rotation on said parts;
   (F) the tubular sleeve having an internal annular flange adjacent the junction of the inner end portion and the outer end portion, said flange being rotatably disposed on the reduced diameter part, and an external annular groove in the reduced diameter part intermediate its ends and at the outer side of said flange;
   (G) and the means for retaining the sleeve on said parts comprises a snap type retainer ring disposed in said external annular groove for engagement with the outer side of said flange to operably retain the sleeve on said parts.

2. The invention defined by claim 1 wherein there are slots in the outer end portion of the tubular sleeve adjacent to but outwardly of the flange to provide access to the interior of the tubular sleeve for installing said retainer in said external annular groove and removing said retainer from said groove.

3. The invention defined by claim 2 wherein the outer end portion of said tubular sleeve is of greater diameter than the inner end portion.

4. The invention defined by claim 3 wherein the luer part is a male luer part.

5. The combination with the invention defined by claim 3 of a luer hub having a luer part mating with the luer part extending from the free end of the reduced diameter part, said luer hub having a plurality of annularly spaced projections operably engageable by the threads within the outer end portion of the tubular sleeve.

References Cited

UNITED STATES PATENTS

| 951,283 | 3/1910 | Krischer | 285—305 X |
| 1,987,499 | 1/1935 | Tabozzi | 285—415 X |
| 2,021,241 | 11/1935 | Mall | 285—305 X |
| 2,076,121 | 4/1937 | Dickinson | 285—332 X |
| 2,122,071 | 6/1938 | Rasmussen et al. | 285—415 |
| 2,443,394 | 6/1948 | Leclair | 285—388 |
| 2,511,396 | 6/1950 | Brekke | 285—332 |
| 1,138,465 | 5/1915 | Fegley et al. | 287—119 |

FOREIGN PATENTS

| 992,097 | 10/1951 | France. |
| 755,118 | 8/1956 | Great Britain. |

DAVE W. AROLA, Primary Examiner

U.S. Cl. X.R.

285—321, 388